(Model.)
E. M. MILES.
CORN PLANTER.
No. 260,700. Patented July 4, 1882.
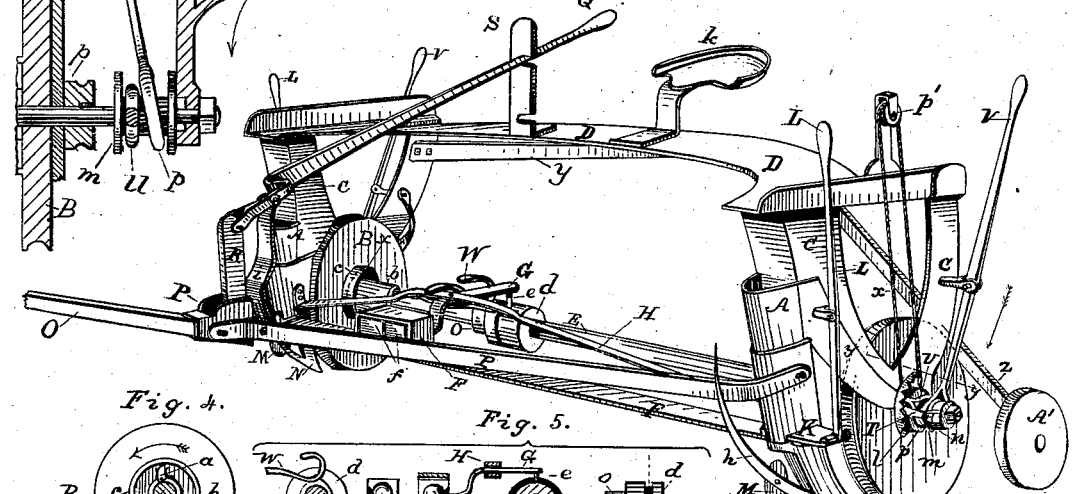
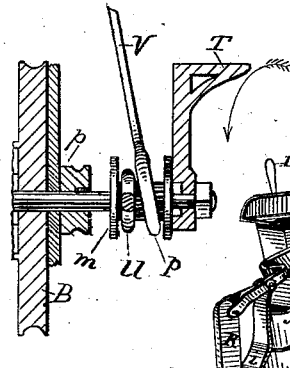
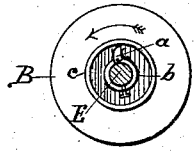
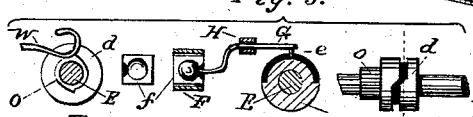
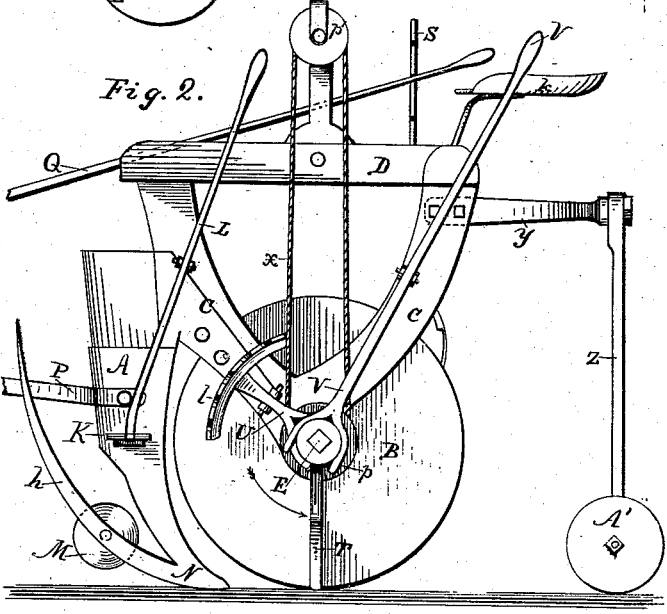
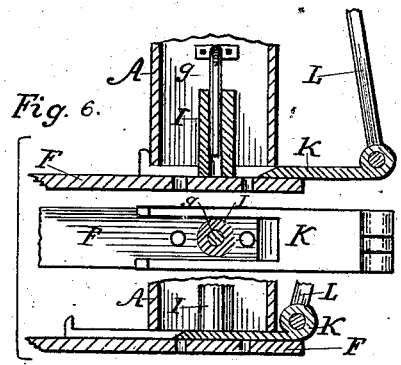
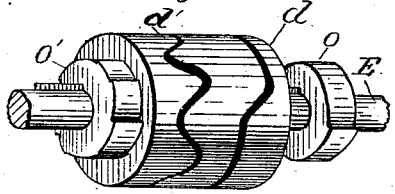
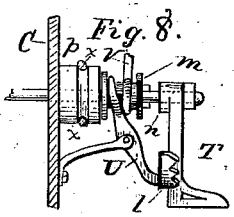
WITNESSES:
Thos Houghton
John C Kennon
INVENTOR:
E. M. Miles
BY
ATTORNEYS.

UNITED STATES PATENT OFFICE.

ENOS M. MILES, OF LAWRENCE, KANSAS.

CORN-PLANTER.

SPECIFICATION forming part of Letters Patent No. 260,700, dated July 4, 1882.

Application filed January 13, 1882. (Model.)

*To all whom it may concern:*

Be it known that I, ENOS M. MILES, of Lawrence, in the county of Douglas and State of Kansas, have invented a new and Improved Corn-Planter; and I do hereby declare that the following is a full, clear, and exact description of the same.

The object of my invention is to furnish an improved machine for planting corn in hills—that is to say, for dropping corn intermittently and covering it at a suitable depth—and also working the ground where required for the purpose of planting in accurate check-row. The planter is mounted on wheels, which serve a threefold purpose, to wit: They sustain the weight of the machine; impart rotation to the axle, and thereby reciprocate the seed-slide; also roll down the furrow in which the corn is dropped. The dropping of seed is cut off automatically by a valve of peculiar construction and arrangement, and it may also be cut off at will by means of other valves which are operated by hand-levers controlled by the driver. The marking devices are held out of action or released and put in action, as desired, by means of lever and clutch mechanism.

The invention further includes peculiar mechanism for setting the seed-dropping devices so as to drop at the required point, as hereinafter described.

In accompanying drawings, Figure 1 is a perspective view of the machine, the hill-marking devices being shown held up out of action. Fig. 2 is an end elevation of the machine, the hill-marking devices being shown in action. Fig. 3 is a detail section of the clutch and hill-marking devices. Fig. 4 is a cross-section on line *x x*, Fig. 1. Fig. 5 is a sectional and side view of mechanism for operating and setting the seed-slide. Fig. 6 includes three sectional views of the devices for regulating the discharge of seed from the hopper. Fig. 7 is a perspective view, showing a modified construction of devices for operating and setting the seed-slide. Fig. 8 is a cross-section on line *y y*, Fig. 1.

The vertical seed-boxes A are arranged directly in front of the grooved covering-wheels B, and secured to one of the curved standards C, which support and are connected by the horizontal frame D. The axle E has its bearings in the lower ends of said standards, and the wheels B are mounted loose thereon, but provided with clutching devices that cause both axle and wheels to revolve together when the machine moves forward. These devices consist of dogs *a*, Fig. 4, pivoted to collars *b*, that are fixed on the axle E, and whose free ends are held pressed against the inner side of circular flanges *c*, formed on the inner side of the wheels B. When the wheels rotate forward the dogs *a* bite or take frictional hold of the flanges *c*, thus carrying the axle around also; but when the wheels rotate backward the dogs slide on the flanges, so that the axle does not revolve. The object of thus rotating the axle E is to impart reciprocating motion to the seed-slide F, which is effected by means of a cam or cam-grooved boss, *d*, and lever G, Fig. 5. The said boss is fixed on the axle, and the lever G is fulcrumed on a bar, H, that rigidly connects the seed-boxes A. Its rear end, *e*, works in the groove of the boss *d*, and its spherical front end in a box, *f*, formed of two blocks, each having semi-spherical recess in its inner face, and both held in keeper attached to the seed-slide F.

The ends of the seed-slide F are provided with perforations to receive seed in the usual way.

Within the seed-boxes is a cut-off valve, I, Fig. 6, which consists of a small sleeve or cylinder that is free to move vertically on a rod, *g*. The valve rests on the seed-slide F, and prevents seed entering the holes therein at the time when the seed already contained in them is allowed to drop into the seed-spout and enter the ground. The valve I therefore operates automatically. The seed-slide F constantly reciprocates while the machine is being drawn forward, so that the intermittent discharge of seed goes on simultaneously; but it is frequently desirable to temporarily arrest its discharge—as, for instance, in turning at the end of a row, or while passing over a piece of ground that is not designed to be planted, or else is too rough for the purpose—and to this end I employ supplementary cut-offs that are under the control of the driver, and do not operate automatically. They consist of flat plates K, Figs. 1, 6, which rest on the seed-slide and work horizontally in slots in the outer side of the seed-boxes A, and are operated by hand-levers L, so that they may be adjusted in or out, as required. Since these cut-offs may be operated independently of each other, it is obvious that discharge of seed may be cut off from either seed-box or both, as required. The inner ends of the cut-offs K are beveled to adapt them to slide under and raise the sleeve or automatic valves I, as shown in lower portion of Fig. 6. The feet or shoes N of the seed-boxes A have curved forwardly-projecting arms $h$, which carry circular cutters M, whose function is to sever the weeds or other trash that may obstruct the path of the furrow-openers, and open soil in the path of the latter. The upward and forward curvature of the arms $h$, carrying said cutters, contributes to this result, since they force the high weeds down under the cutters.

The tongue O is pivoted in a frame or hounds, P, that are rigidly attached to the machine. A lever, Q, is connected by a link, R, with the rear end of said tongue, and fulcrumed in a vertical support, $i$, so that by depressing the rear end of the lever the shoes N will be raised more or less, so as to regulate the depth of the planting; or they may be even lifted clear of the ground to permit the machine to be turned easily on the wheels B.

The lever Q may be held locked in different adjustments by means of a rack, S, fixed on the frame D, contiguous to the driver's seat $k$.

It is desirable to mark the last hill or dropping of each row planted, in order that the hills of the next row to be planted may "check" or be in exact line with the hills of the adjacent row already planted. To this end, bars T are hung loose to the end of the axle A; but, except when required for use at the ends of the row, they are held up by means of levers U, Figs. 1 and 8, having notched bars $l$ on their outer ends, while their inner ends are connected with half clutch-boxes $m$, Figs. 3, 8, that slide on a feather on axle A, and are adapted to engage corresponding clutches, $n$, formed on the hubs or journaled ends of the marker-bars T.

Hand-levers V are connected with the clutches $m$ for adjusting them in or out on the axle. Thus when the clutches $m$ are moved inward, Figs. 1, 8, the notched ends $l$ of the levers U are thrown out, and thus caused to arrest and hold up the marker-bars T out of action; but when the said clutches are moved outward, Fig. 3, they lock with clutches $n$, and the notched levers U being thus simultaneously reversed in position, the marker-bars are caused to revolve with the axle, and thereby mark the ground at each revolution. As before intimated, the marking only requires to be done at the end of each row planted. The clutches $m$, or, rather, the feather on which they slide, are so located on the axle circumferentially with reference to the abrupt angles or deflections of grooves of boss $d$ that the seed-slide F will be operated, and seed allowed to discharge from one of the seed-boxes A at the moment when the marker-bar T on the adjacent side of the machine strikes the ground. Therefore to mark the last hill dropped, the driver seizes the lever U on the inner side of the machine, throws clutch $m$ into engagement with adjacent clutch, $n$, of a marker, T, just before arriving at the end of a row, thus marking the last hill dropped. The hand-lever U is then reversed, Fig. 8, to disengage the clutches $m$ $n$, and the rear end of lever Q depressed to raise the shoes N, thus enabling the machine to be turned around. When the machine has been placed parallel with the last row, the team is stopped and the driver proceeds to adjust the dropping apparatus so that a hill shall be dropped exactly opposite the last one marked. To enable him to do this I provide a curved spring, W, Fig. 1, which is attached to the bar H, and its free end projects rearward over a cylindrical collar, $o$, or lateral portion of the boss, Figs. 1, 5. The said collar has shoulders at opposite points on its periphery, each of which is in alignment with one of the deflections of the groove in the boss $d$. The driver holds the spring W depressed and in contact with the collar $o$ by foot-pressure, while he rotates the axle A until one of the shoulders of the collar comes in contact with the spring W, which notifies him that the slide F is in position to drop seed. He then releases spring W and starts the machine, which will continue to drop seed in accurate check-row with the previous droppings. This rotation of the axle, as last described, is effected by an endless cord, X, Figs. 1, 2, or band on pulleys $p$ $p'$, one, $p$, being fast on the axle A and the other journaled loose on the frame D.

The boss $d$, as shown in Figs. 1 and 5, has two abrupt deflections, and hence the seed-slide F will make two shifts at each rotation of the boss. The collar $o$ is therefore provided with two shoulders. These devices are adapted for check-row dropping.

To adapt the machine for drilling it is necessary to employ a boss having a groove with a greater number of angles or lateral deflections, and such is shown at $d'$ in Fig. 7. In connection with such boss $d'$ it is also necessary to use a stop-collar, $o'$, having a number of shoulders corresponding to the deflections in boss $d'$. Of course a separate spring like spring W must in practice be provided for this collar $o$. Both bosses $d$ $d'$ are preferably made in one piece, and they are adapted to slide on a feather of the axle E, Fig. 7, so that they may be shifted endwise to bring either into working relation to the lever G, Fig. 1.

To the rear portion of the machine is attached a rigid bar, Y, to which is pivoted a bar, Z, carrying a roller, A'. The function of the latter is to mark a line for guide for the team in driving across the field.

The marker Z A' may be shifted by the driver from side to side, as required.

I have described the machine as adapted for use independently of others; but in practice I propose in some cases to employ it in connection with a revolving plow or spader for which I have made a separate application for Letters Patent.

The planter is adapted for attachment in front of each plow by removing the frame D.

My friction-clutch for locking wheels and axle together is indispensable, and could not be replaced by the ratchet-and-pawl clutch ordinarily employed, since the latter would permit the carrying and covering wheels to revolve a part of their circumference corresponding to the space passed over by the pawl when moved from one ratchet-tooth to another, which may involve a variation of eight to ten inches from the point where the dropping should begin, whereas my friction-clutch locks the wheels and axle instantly, and thereby avoids such inaccuracy of adjustment.

Having thus described my invention, what I claim as new is—

1. In a corn-planter, the combination, with the seed-box, vertically-adjustable automatic seed cut-off, and the reciprocating seed-slide, of independent cut-off plates which are adapted to be inserted between said automatic cut-off and seed-slide, as shown and described.

2. In a corn-planter, the combination, with the rotating axle and marking devices hung loose thereon, of adjustable bars or levers which may be thrown into position for engaging or locking with said marking devices, for holding them out of work, as hereinbefore specified.

3. In a corn-planter, the combination, with the rotating axle and marking devices hung loose thereon, of levers having notched outer ends, and means for adjusting said levers to throw them into position for holding the markers up or out of work, as shown and described.

4. In a corn-planter, the combination, with the rotating axle and marking-bars hung thereon, of clutch-boxes sliding on a feather, and means for adjusting them for the purpose of locking them with the markers, as shown and described, for the purpose specified.

5. In a corn-planter, the combination of the friction-clutch or locking devices, as described, with the carrying and covering wheels, the axle having the cam-grooved boss, and the seed-slide and lever, all as shown and described, to operate as specified.

6. In a corn-planter, the combination, with the seed-slide and cam-grooved boss on the axle, of the lever having its front end made spherical, and the journal-box formed of two blocks having semi-spherical recesses in their opposite faces, and secured in a keeper fixed on a rigid portion of the machine, as shown and described.

7. In a corn-planter, the combination, with the rotating axle and markers hung loose thereon, and constructed with a half clutch-box, $n$, of the corresponding clutch-boxes, $m$, the hand-levers for adjusting them, and levers having notched ends for engaging with the markers, all as shown and described, for the purpose specified.

8. The combination of the reciprocating seed-slide and rotating axle having a cam-grooved boss, the pivoted lever for operating the slide, the markers, and clutch devices revolving with the axle, and placed circumferentially on the latter with reference to the seed-dropping devices, as shown and described, for the purpose specified.

9. In a corn-planter, the combination of the spring or foot piece W and the cam-grooved boss $d$, having shoulders arranged on opposite sides, with the rotating axle, the seed-hoppers and seed-slide, the lever for operating the latter, and means for adjusting it (seed-slide) when the machine is at rest, as shown and described.

ENOS M. MILES.

Witnesses:
CHAS. P. COPELAND,
J. O. BARDELL.